(12) United States Patent
Wray

(10) Patent No.: US 10,327,310 B2
(45) Date of Patent: Jun. 18, 2019

(54) BACKUP POWER FOR DISTRIBUTED LIGHTING SYSTEM AND METHOD

(71) Applicant: Donald L. Wray, Ocala, FL (US)

(72) Inventor: Donald L. Wray, Ocala, FL (US)

(73) Assignee: USAI, LLC, New Windsor, NY (US)

( * ) Notice: Subject to any disclaimer, the term of this patent is extended or adjusted under 35 U.S.C. 154(b) by 0 days.

(21) Appl. No.: 16/164,298

(22) Filed: Oct. 18, 2018

(65) Prior Publication Data

US 2019/0116649 A1    Apr. 18, 2019

Related U.S. Application Data

(60) Provisional application No. 62/573,753, filed on Oct. 18, 2017.

(51) Int. Cl.
| | |
|---|---|
| *H05B 37/02* | (2006.01) |
| *H02J 9/06* | (2006.01) |
| *H05B 33/08* | (2006.01) |
| *H02J 7/02* | (2016.01) |

(52) U.S. Cl.
CPC ............ *H05B 37/0245* (2013.01); *H02J 9/06* (2013.01); *H05B 33/0857* (2013.01); *H02J 7/027* (2013.01)

(58) Field of Classification Search
CPC .. H05B 37/02; H05B 37/029; H05B 37/0272; H05B 37/0263; H05B 33/0845; H05B 33/0893; H05B 33/0812; H05B 33/089; H02J 9/04; Y02B 20/46
See application file for complete search history.

(56) References Cited

U.S. PATENT DOCUMENTS

| | | | | |
|---|---|---|---|---|
| 9,253,852 | B2 * | 2/2016 | Campbell | H05B 37/02 |
| 9,345,091 | B2 * | 5/2016 | Pickard | H05B 37/0218 |
| 9,955,544 | B1 * | 4/2018 | Pishdadian, Jr. | H05B 37/0218 |
| 10,009,973 | B1 * | 6/2018 | Wray | H05B 33/0845 |
| 2018/0263095 | A1 * | 9/2018 | Wray | H05B 37/0245 |
| 2018/0359833 | A1 * | 12/2018 | Wray | H05B 33/0884 |

* cited by examiner

*Primary Examiner* — Haissa Philogene
(74) *Attorney, Agent, or Firm* — St. Onge Steward Johnston & Reens LLC

(57) ABSTRACT

A lighting control system that allows for flexible control of low-voltage LED light fixtures connected to an output of a digital power module such that during "normal" operation where the digital power module is receiving electrical power from the building electrical system, the digital power module controls the connected light fixtures according to a first control scheme and in the event of an interruption of building electrical power ("emergency" operation), the system receives backup power and control the connected light fixtures according to a second control scheme.

27 Claims, 7 Drawing Sheets

BACKUP POWER FOR DISTRIBUTED LIGHTING SYSTEM AND METHOD

FIELD OF THE INVENTION

The invention relates to a distributed lighting system and, more specifically, to backup power for a distributed low voltage lighting system.

BACKGROUND OF THE INVENTION

Distributed lighting systems typically have a central controller and have distributed/remote light fixtures connected to and controlled by the central controller, whereby the central controller receives power from a power source and receives control signals from one or more analog and/or digital control inputs, and, in turn, provides power and control signals to the light fixtures. For example, multiple Light Emitting Diode (LED) light fixtures, which typically use a very small amount of electrical power as compared to "standard" light fixtures that use incandescent or fluorescent lamps, can be connected to central controller by low voltage wiring which provides both power and control to the LED light fixtures.

The central controller may be connected to building power, which may comprise 120V/277V AC in the United States. With conventional lighting, if power to the building is interrupted, it is important to provide emergency lighting in a commercial or industrial space to enable the occupants to safely and quickly exit the building. Emergency power may be provided with a battery that is positioned in the light fixture itself, or may be provided by a backup generator that provides power in the event of a power interruption. In the case of LED lighting, the amount of electrical power that is consumed per light fixture is much lower than in conventional light fixtures, which opens up the possibility for different lighting schemes or configurations during a power interruption.

Additionally, unlike conventional lighting which are substantially controlled as a binary state (e.g., On/Off), LED light fixtures require enhanced control. For example, during a power outage, a conventional light fixture could simply be provided with power from an alternate source (i.e., a battery, a generator, etc.) whereas an LED light fixture not only needs power, but needs a control signal that will set the intensity of the light fixture and the color of the fixture.

However, in the event of a power interruption or failure, the central controller will cease functioning without power. Likewise, the various control inputs to the central controller will cease functioning without power. This means that even if power is provided to the central controller, the various peripheral devices will not be powered and therefore no control signals can be generated to send to the central controller.

So, while LED light fixtures provide some distinct advantages over conventional lighting, the control schemes are much more complicated and the ability to control LED lighting fixtures during a power interruption has been very limited.

SUMMARY OF THE INVENTION

The above described problems are addressed in one configuration by the provision of a lighting control system that includes a Digital Power Module (DPM) that is connected to a source of power. The DPM is provided with at least one control input that is adapted to receive a control signal from a control device for controlling at least one LED light fixture. The DPM is further provided with at least one digital output that is adapted to transmit a digital signal based on the received control signal. A Fixture Control Module (FCM) is coupled to the output of the DPM and is adapted to receive the digital signal for controlling an associated LED light fixture. A backup power supply is connected to the source of power and the DPM such that in the event of an interruption in the source of power, the backup power supply is adapted to provide power to the DPM.

In one configuration, if the DPM receives power from the backup power supply, the DPM is adapted to send an emergency mode lighting control (EM) signal to the FCM. The EM signal can provide a preset intensity level and a preselected color setting.

It will further be understood by one of skill in the art that the LED light fixtures may, in one configuration, comprise an address such that various instructions can be sent on the digital output of the DPM, but only instructions with the proper address will be acted on by the LED light fixture. In this configuration, multiple LED light fixtures could be connected to a single digital output of the DPM where each LED light fixture could be independently controlled. In the event of an interruption in power, the DPM could send the EM signal having an address such the only the LED light fixtures with the corresponding address will act on the EM signal. In this manner, a user can select which LED light fixtures will function as emergency lighting in a space. Likewise, a user can modify or alter which LED light fixtures will function in an emergency situation and could even program the system to control specific LED light fixtures in a first manner in a first emergency situation and control specific LED light fixtures in a second manner in a second emergency situation.

It is contemplated that the DPM could in one embodiment, comprise a control module, which could include a processor and an associated storage device. Likewise, the DPM could be coupled to a remote computer via a network connection such that individual DPMs in a facility connected to associated FCMs could be remotely monitored, programmed and controlled.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one configuration a lighting control system is provided comprising a digital power module (DPM) including: a processor, at least one control input operable to receive an input control signal and an output operable to transmit an output control signal. The lighting control system further comprises a fixture control module (FCM) having identification data stored thereon and having an associated LED light fixture, and the FCM being connected to the DPM and adapted to receive the output control signal. The lighting control system is provided such that the FCM is adapted to control the associated LED light fixture according to the output control signal and the DPM is connected to a source of electrical power and being operable to provide D/C power to the FCM. The lighting control system further comprises a backup power supply having a battery, the backup power supply connected to the source of electrical power and the DPM and adapted to provide electrical power to the DPM and the FCM. The lighting control system is further provided such that when the DPM receives power from the source of electrical power, the DPM transmits the output control signal based on the received input control signal, the output control signal has identification data such that the FCM will control the associated LED light fixture according to the output control signal when the identification data in the output control signal matches the identification data stored on the FCM. Finally, the lighting control system is provided such that in lighting control system is further provided such that event of an interruption of electrical power from the source of electrical power, the backup power supply provides electrical power to the DPM and the DPM is adapted to transmit a predetermined emergency mode lighting control (EM) signal on the output, the EM signal including identification data such that the FCM will control the associated LED light fixture according to the EM signal when the identification data in the EM signal matches the identification data stored on the FCM.

In another configuration a lighting control system is provided comprising a digital power module (DPM) including: a processor, at least one control input operable to receive an input control signal and an output operable to transmit an output control signal having address data associated therewith. The lighting control system is provided such that the DPM is connected to a source of electrical power and being operable to provide D/C power to the FCM. The lighting control system further comprises a backup power supply having a battery, the backup power supply connected to the source of electrical power and the DPM and adapted to provide electrical power to the DPM and a fixture control module (FCM) connected to the DPM and adapted to receive the output control signal. The FCM includes a storage having a data address and an EM address stored thereon and an LED light fixture. The lighting system is provided such that the FCM receives the output control signal and compares the address data with the data address and the EM address, the FCM adapted to control the LED light fixture according to the output control signal when the address data matches either the data address or the EM address. The lighting system is further provided such that when the DPM receives power from the source of electrical power, the DPM transmits the output control signal based on the received input control signal that includes address data matching the data address such that the FCM will control the LED light fixture in accordance with the input control signal. Finally, the lighting system is still further provided such that in the event of an interruption of electrical power from the source of electrical power, the backup power supply provides electrical power to the DPM and the DPM transmits the output control signal based on a predetermined emergency mode lighting control (EM) signal that includes address data matching the EM address such that the FCM will control the LED light fixture according to the EM signal.

Other objects of the invention and its particular features and advantages will become more apparent from consideration of the following drawings and accompanying detailed description.

DETAILED DESCRIPTION OF THE INVENTION

Figure 1:
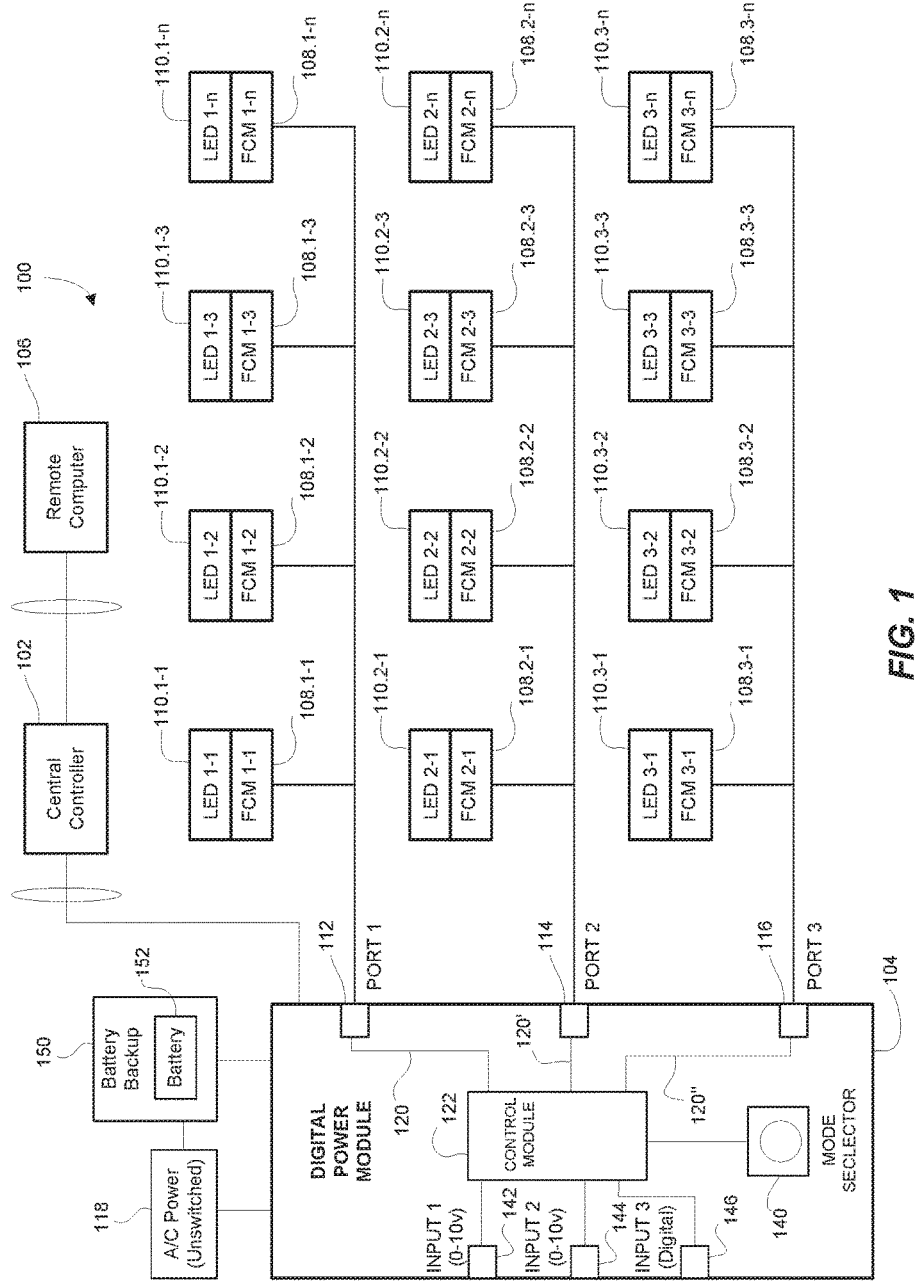
FIG. 1 is a block diagram of a distributed lighting system having backup power.

Referring now to the drawings, wherein like reference numerals designate corresponding structure throughout the views.

Referring to FIG. 1, a distributed lighting system 100 is illustrated that can include a central controller 102 that is coupled to a Digital Power Module (DPM) 104 via a network connection. The central controller may, in turn, be connected to a remote computer 106. The DPM 104 is coupled to at least one remote/distributed Fixture Control Module (FCM) 108.1-1 that controls an associated fixture 110.1-1 (e.g., an LED light fixture). The DPM 104 may comprise a plurality of lighting channels/ports 112, 114, 116, each of which may be connected to a plurality of FCMs (108.1-1, 108.2-1, 108.3-1, etc.). The DPM 104 can include an Alternating Current (AC) main power input 118 (e.g., 120V/277V), and a Direct Current (DC) output 120, 120', 120" (e.g., 48V) for each lighting channel 112, 114, 116 respectively. The DPM 104 can, in one embodiment, supply 5-500 mA of current to sensors such as daylight and occupancy sensors, or other types of sensors used for lighting control. As can be seen in reference to FIGS. 1 and 2, three inputs 142, 144, 146 are provided for DPM 104. While the first two inputs 142, 144 are listed as "0-10 v" inputs and the third input 146 is listed as a "digital" input, it is conceived that different configurations are possible or advantageous and fewer or greater numbers of inputs could be provided. As stated previously, the 0-10 v inputs could be provided to receive a variable voltage signal from a dimmer or daylight sensor or the like, whereas the digital input could receive a digital input signal from a digital controller (e.g., a DMX controller) or a contact closure such as an occupancy sensor or the like, or another suitable device. Many different configurations will be evident to those of skill in the art.

In one configuration, the DC power is transmitted/outputted to the FCMs (108.1-1, 108.2-1, 108.3-1, etc.) via low-voltage wiring, such as class 2 wiring comprising for example, CAT 5/6/6E cable. It can further be seen in FIG. 1 that the FCMs can be connected to the wiring in parallel, in a daisy chain configuration. In this manner, failure of any single FCM (e.g., the FCM typically fails open) would not adversely impact any of the remaining FCMs (and therefore any of the other light fixtures) connected on the channel. The DPM 104 also provides control signals to the FCMs, such as digital control signals (e.g., DMX and the like), via the low-voltage wiring and/or in one configuration, via a wireless connection.

The DPM 104 may further include a control module 122 including a processor 124 (see, FIG. 2) which may comprise a Microprocessor, a Field Programmable Gate Array, a Digital Signal Processor, a Microcontroller or the like), which may further include a transmitter/transceiver, for processing control inputs and for transmitting control signals to the FCM(s), for example, via the low voltage wiring and/or wirelessly. The control module 120 may further comprise a storage 126 that is accessible by the processor 124. Each FCM (108.1-1, 108.2-1, 108.3-1, etc.) is operable to receive the control signal(s) transmitted from the DPM 104 and, based on such control signals, is operable to control drivers (not shown) which drive the various color channels of the LED lighting fixtures (110.1-1, 110.2-1, 110.3-1, etc.), which may include pulse-width modulation (PWM) and/or other control methods and techniques. The FCMs 108.1-1 may also be provided with a processor 130.1-1 and a receiver/transceiver for receiving and processing the control signals and for controlling the drivers. The FCMs (108.1-1, 108.2-1, 108.3-1, etc.) may also be operable to transmit information and/or control signals to the DPM 104 in the same manner.

Preferably, the FCMs (108.1-1, 108.2-1, 108.3-1, etc.) are capable of being set to receive data addressed to one or more data addresses (for example, 4 data addresses corresponding to 4 color channels) within an address space of for example, up to 512 addresses. Preferably each/any FCM (108.1-1, 108.2-1, 108.3-1, etc.) can also be configured to receive data sent to a predefined "Emergency Mode" (EM) address (e.g., address 512) to cause the FCM to operate in Emergency Mode as directed by the DPM 104. Each FCM (108.1-1, 108.2-1, 108.3-1, etc.) can be configured as an EM light by a mode selector 140 (e.g., a manual switch or jumper setting), or by a firmware or software setting, or another setting. Also, such setting is preferably accessible and setable before, during and after installation of the FCM and associated light fixture, for example through the aperture of the light fixture from within the room. It is contemplated that the FCMs are, by default, set to disregard the EM signal.

It is contemplated that the FCM could comprise one address that uniquely identifies the FCM such that various commands can be individually transmitted to an FCM on a single output. For example, during a first system status (e.g., normal operation status) the system could function to transmit a first signal to the FCM having an address that matches the FCM unique address. Then, during a second system status (e.g., emergency power operation) the system could function to cease transmitting the first signal and could instead, transmit a second signal to the FCM having an address that matches the FCM unique address. In this instance, the first signal could correspond to a received control input signal whereas the second signal could correspond to preprogrammed settings for the FCM. As each FCM has a unique address, each FCM can be individually controlled such that certain light fixtures are turned off and others are operated in an emergency load. In any event, maximum flexibility for light fixture operation is provided.

Alternatively, it could be that the address for one or more FCMs could be set to the same address such that instructions with an associated address can be sent multiple fixtures on a single output.

Still further, it is contemplated that an FCM could be provided with multiple addresses such that the FCM can be controlled by signals having multiple different addresses. For example, in one configuration, it is contemplated that if power is being provided to the DPM via the normal building power, the output could comprise a signal that includes a first address (or a data address) that corresponds to an address saved in the FCM. Additionally, if an interruption to the normal building power occurs, power could be provided to the FCM via a backup power source (e.g., a battery backup). In this case, the output signal could include data with both the first and a second address (or an emergency (EM) address) where the first address data comprises an Off instruction and the second address comprises a predetermined setting for the light fixture, such as an On instruction. Whether the FCM is "looking" for an EM signal will be determined by a setting on the FCM (e.g., the unit could be provided with a switch allowing it to be set to "emergency" mode) allowing that FCM to be utilized as an emergency light fixture in the event of a power loss.

In any of the above-described configurations, it will be possible to connect multiple FCMs to a single output channel (wired or wireless) to receive a control input. This enables multiple FCMs each with an associated LED light fixture, to be selectively controlled even while being connected to the same data/control channel.

As discussed previously, battery backup 150 includes a battery 150. The battery backup 150 is connected to the building power 118 and to the DPM 104 and is adapted to provide emergency power to DPM 104 and FCMs in the event of an interruption in to building power 118. While the DPM 104 is depicted as being connected directly to the building power, it is contemplated that DPM 104 could be connected to building power only through battery backup 150.

Figure 2:
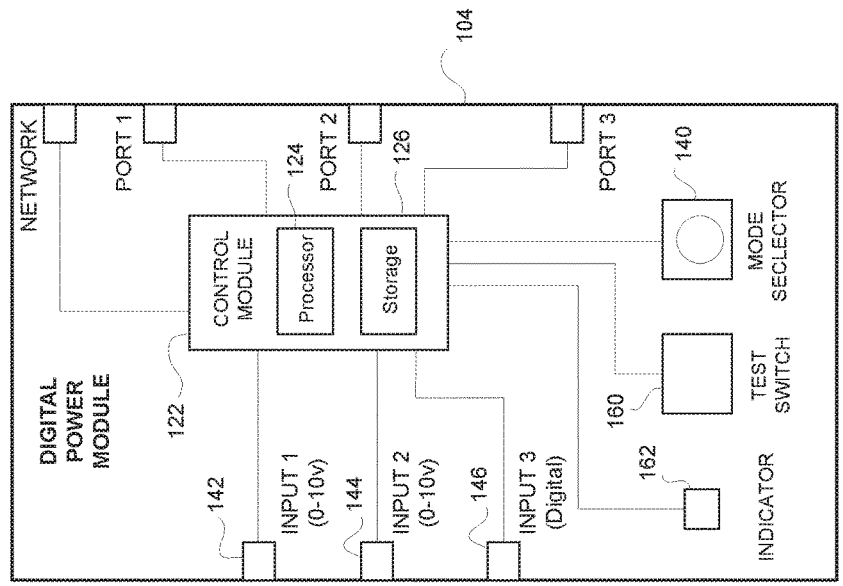
FIG. 2 is a block diagram of the Digital Power Module according to FIG. 1.
Figure 3:
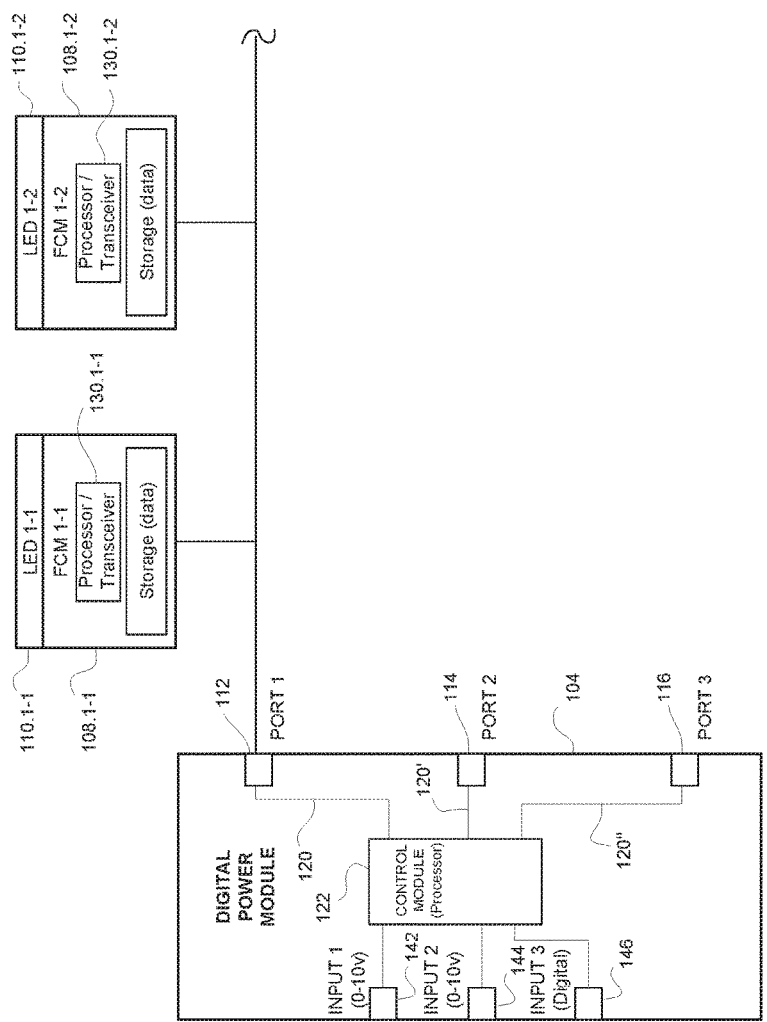
FIG. 3 is a block diagram of the various Fixture Control Modules according to FIG. 1.
Figure 4:
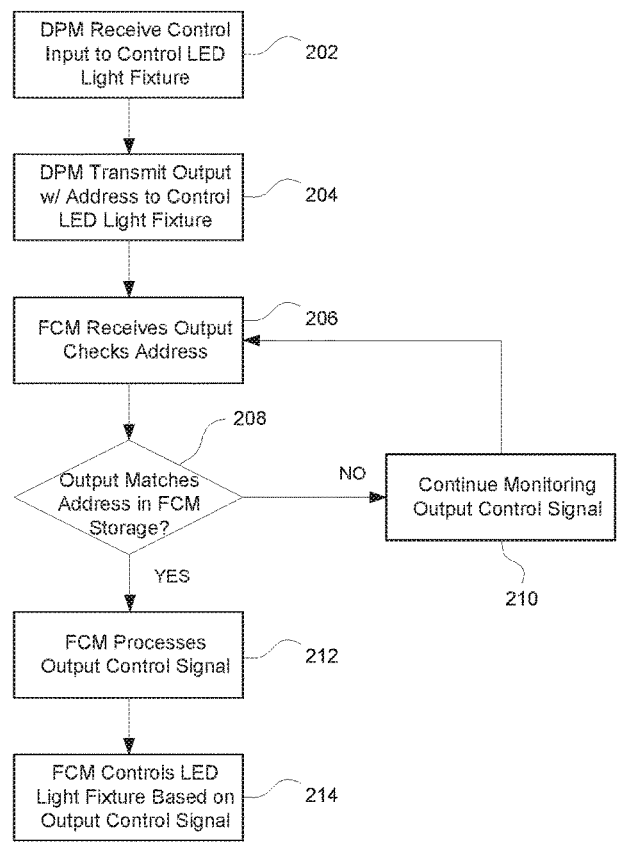
FIG. 4 is a flow diagram of a control scheme for transmitting a control signal from the Digital Power Module to the Fixture Control Module according to the distributed lighting system of FIG. 1.
Figure 5:
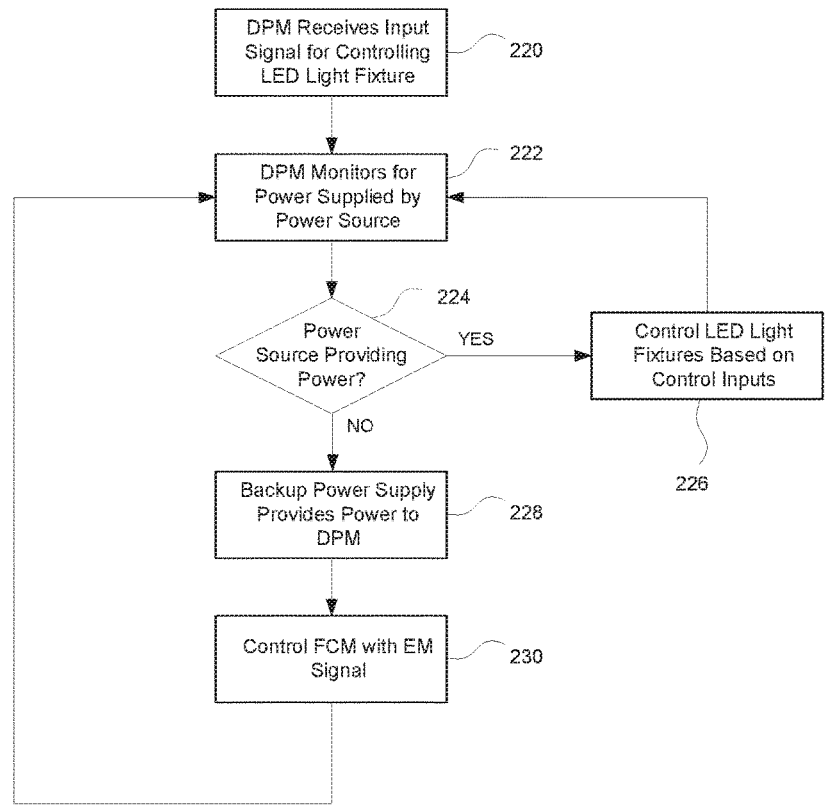
FIG. 5 is a flow diagram of a control scheme for providing a control signal to the Fixture Control Module during a power interruption according to the distributed lighting system of FIG. 1.
Figure 6:
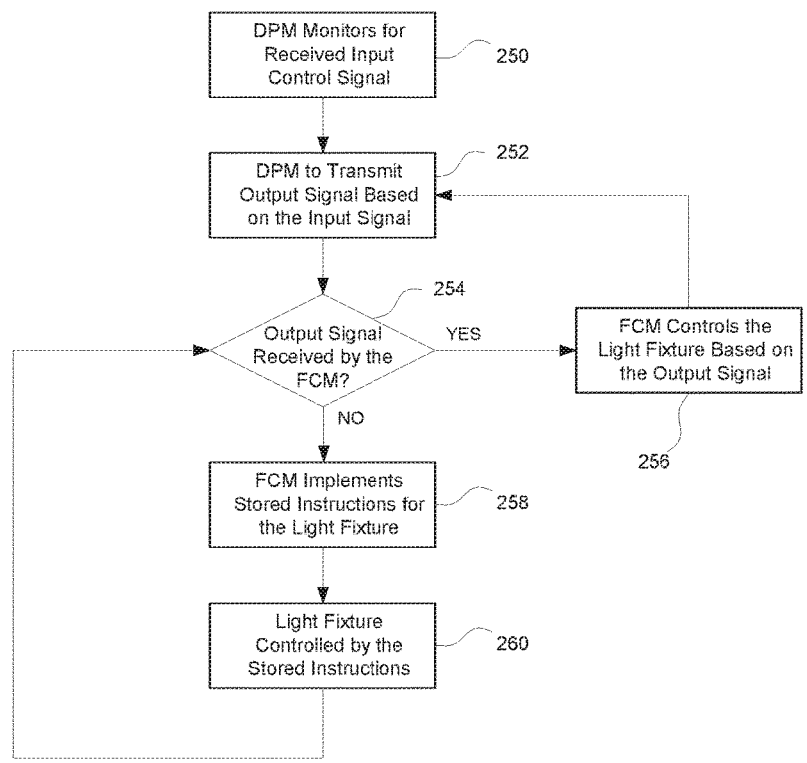
FIG. 6 is a flow diagram of a control scheme for controlling an LED light fixture associated with a Fixture Control Module during a during a loss of output signal from the Digital Power Module according to the distributed lighting system of FIG. 1.
Figure 7:
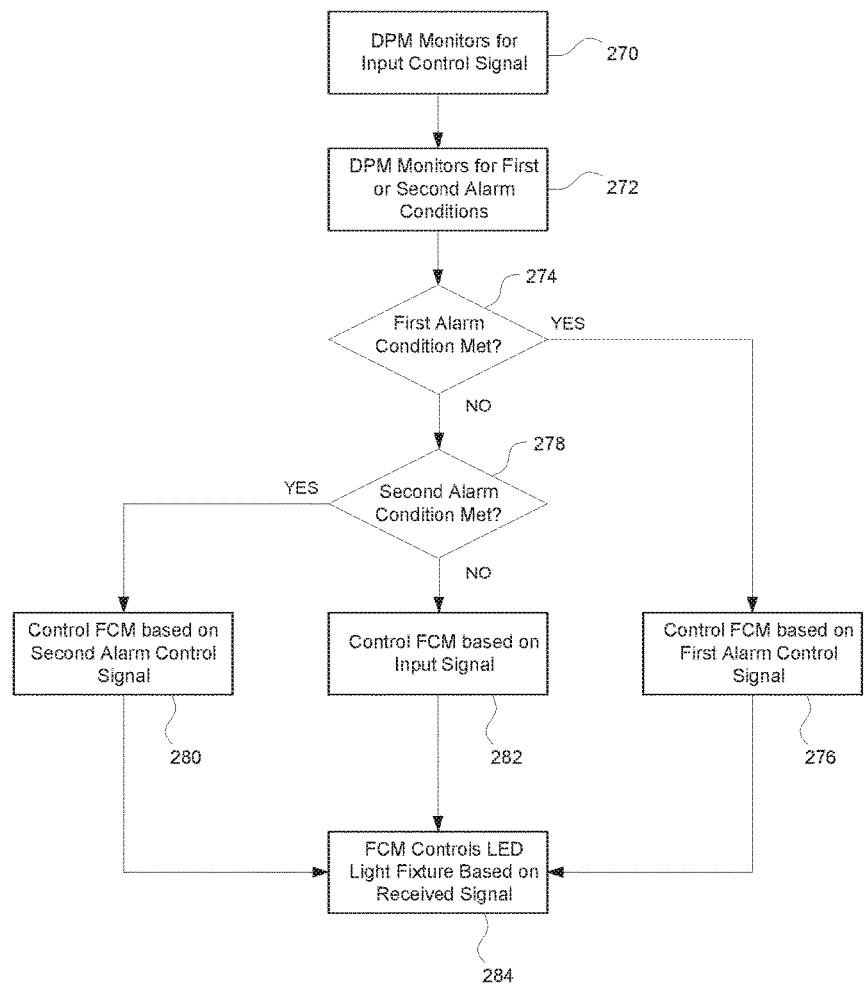
FIG. 7 is a flow diagram for controlling a Fixture Control Module based on first and second control schemes according to the distributed lighting system of FIG. 1.

Reference will now be made to the various flow diagrams depicted in FIGS. 4-7 with further reference to the block diagrams in FIG. 1-3. During normal operation, the DPM 104 receives power from the main power input and thereby provides power to the FCMs (108.1-1, 108.2-1, 108.3-1, etc.) and light fixtures (110.1-1, 110.2-1, 110.3-1, etc.). The DPM 104 also receives control signals 202 from one or more control inputs 142, 144, 146 and provides control signals to the various FCMs (108.1-1, 108.2-1, 108.3-1, etc.) based on the control inputs. The control signals provided to the FCMs can be, for example, various intensity values for each color channel in each light fixture, ranging from zero (off) to 254 (full on) and values in between, or some other suitable range or values.

The DPM 104 can transmit an output control signal with an address(es) to control LED light fixture(s) 204 that are connected to an associated FCM. As previously noted, the various FCMs are programmed to accept data that include one or more data addresses, which could correspond to different color channels for the LED light fixture associated with a particular FCM. The FCM (108.1-1, 108.2-1, 108.3-1, etc.) will receive the output from the DPM 104 and will check the address(es) 206. If the address(es) do not match 208 the data in FCM (108.1-1, 108.2-1, 108.3-1, etc.), the FCM will take no action and continue monitoring for the output signal 210 from the DPM 104. If, however, the output signal includes data that matches one or more addresses at the FCM (108.1-1, 108.2-1, 108.3-1, etc.), the FCM will process the received control signal 212. The FCM (108.1-1, 108.2-1, 108.3-1, etc.) will then control the associated LED light fixture based on the received control signal 214.

As previously stated, the data corresponding to the addresses in the output signal from the DPM 104 could, in one configuration, comprise up to 512 addresses. This would provide a wide variety of control options for a plurality of connected LED light fixtures. For example, many LED light fixtures include several different color LED lights on distinct color channels in a single light fixture. For example a light fixture could include four color channels (e.g., Red, Green, Blue and White (RGBW)) that can be variably illuminated and mixed to create virtually any desired color. Each color channel for an LED light fixture could have an associated address such that for a first predefined lighting scene, an LED light fixture receives first predefined data for operate the associated LED on each of four channels in a first manner. However, for a second predefined lighting scene, an LED light fixture could receive second predefined data to operate the associated LED on each of four channels in a second manner. It can be seen that many different LED light fixtures could be individually and distinctly controlled based on the relatively large number of addresses available to utilize.

The system further includes a battery backup 150 operable to supply power to the DPM 104 in the event of a power failure/interruption or other loss of power to the main power input 118 of the DPM 104. The battery backup 150 could comprise, for example, a 12 volt battery, which may then be converted to a higher voltage, such as 48 volts, and up to 1.5 amps. It is contemplated that the battery backup 150 may be designed to provide in one configuration, 25% of the normal operating power of the DPM 104 for a period of approximately 90 minutes.

The battery backup 150 is preferably connected to an unswitched power source 118 (e.g., the building A/C power distribution source) for charging the battery 152. The DPM 104 is operable to monitor the status of the main power input 222 to the DPM 104 and/or the unswitched power source 118 to the battery backup 150. In the event that power is being provided by the building distribution system 224, the system will continue to provide power to the FCMs based on the power received via the main power input and to control the FCMs and associated LED light fixtures based on the control inputs received by the DPM 226.

In the event of an interruption or loss of power for a predetermined period of time, the system is adapted to disengage from the main power input and to engage and draw power from the battery backup 228 and to provide such power to the DPM and FCMs.

Additionally, upon engaging the battery backup, the DPM is operable to disregard input controls and to send an emergency mode lighting control signal (EM signal) 230 with a predetermined EM "on" code (e.g., FF) to a predetermined emergency mode (EM) address (e.g., address 512) instructing FCMs configured to listen to such EM address to operate in a predetermined EM mode, which can be, for example, a predetermined intensity level (e.g., 25%) and/or a predetermined color (e.g., white).

In addition, upon engaging the battery backup 150, the DPM 104 is operable to send a control signal to all connected FCMs to turn off (i.e., a "lights off" signal), which can be accomplished by sending a power off signal(s) (e.g., zero value) to all possible addresses of FCMs (or all known FCM addresses). The "lights off" signal(s) (addressed to various data addresses of the FCMs) and the EM "on" signal (addressed to the EM address) can be within one DMX frame, which can be sent at a rate of 44 Hz or another suitable rate. In this case, FCMs operating in EM mode will receive, in one DMX frame, both an off signal sent to their assigned data address(es) and the EM "on" signal sent to the EM address. FCMs operating in EM mode are configured to prioritize and act on the EM signal in such frames and to disregard the accompanying off signal(s) if the EM on signal is also present. However, if the EM on signal is not present, then the FCMs are configured to act on the signals sent to their data addresses, which might be an off signal (e.g., a zero value) or an on signal value (e.g., a non-zero value). For example, if the FCM (108.1-1, 108.2-1, 108.3-1, etc.) is configured to be in EM mode, the FCM can be operable to process the DMX frame to first look for and (only) act on the EM "on" code, if present, before looking for a signal addressed to the data address(es) of the FCM (108.1-1, 108.2-1, 108.3-1, etc.).

Upon resumption of power for a predetermined period of time, the DPM 104 is operable to disengage the battery backup 150 and resume drawing power from the main power input 118 to power the LED light fixtures (110.1-1, 110.2-1, 110.3-1, etc.). Upon disengagement of the battery backup 150, the DPM 104 is also operable to cease sending the EM "on" code to the EM address (which can include sending a different value, e.g., a zero value, to the EM address, or no data) and is operable to resume normal operation of sending control signals to the FCMs (108.1-1, 108.2-1, 108.3-1, etc.) based on the control signals received from the control inputs 142, 144, 146 connected to the DPM 104. FCMs (108.1-1, 108.2-1, 108.3-1, etc.) receiving such control signals (without the presence of the EM on signal) will act on the control signals and thereby resume normal operation.

As can be appreciated other procedures may be employed to instruct the FCMs (108.1-1, 108.2-1, 108.3-1, etc.) and associated LED light fixtures (110.1-1, 110.2-1, 110.3-1, etc.) configured to act as EM lights to operate in EM mode and/or to revert to normal operation upon engagement and disengagement of the battery backup 150, including, without limitation, sending the EM "on" signal independently of the "lights off" signals (for example in different frames or at different times and/or rates) during engagement of the battery backup 150.

The DPM 104 can include means to test the function of the battery backup, such as, a switch 160 to manually interrupt the monitored main power input and/or the unswitched power source 118 for the battery backup 150, and can include an indicator light 162 or lights to indicate the status of the battery 152 (e.g., fully charged, charging, engaged, disengaged, etc.), and/or the status of the DPM 104 (e.g., on main power input, on battery backup, etc.).

The DPM 104 may also monitor the processor 124 in the DPM 104 and upon detecting that the processor 124 is not functioning (and thus not processing and sending control signals to the FCMs), the DPM 104 can be operable to provide 48 volt power to all FCMs (108.1-1, 108.2-1, 108.3-1, etc.), as long as the main power input is active.

In another configuration, the FCMs (108.1-1, 108.2-1, 108.3-1, etc.) may be operable, upon loss of a control signal, to default to a predetermined mode. For example, the DPM monitors for a received input control signal 250. The DPM 104 then transmits an output signal based on the received input signal 252. The FCM looks for an output signal 254 to match an address corresponding to the address of the FCM. If a signal is received with a matching address, the FCM controls the associated LED light fixture based on the received signal 256 as previously discussed. If there is a problem or malfunction with the DPM 104, it could be the case that no output signal is being sent to the FCMs (108.1-1, 108.2-1, 108.3-1, etc.). Rather than simply reading the lack of signal receipt simply being a lack of address match and therefore no instructions being sent, the FCMs (108.1-1, 108.2-1, 108.3-1, etc.) could, for example, default to a "trouble" lighting mode in the event that no control signal is sent within a predetermined time frame. If the predetermined time frame is exceeded, the FCM could then implement instructions stored locally for controlling the associated LED light fixture 258. In one example, the stored instructions could define a predetermined intensity (e.g., 25%) and/or a predetermined color (e.g., white).

In still another configuration, it is contemplated that the LED light fixtures could be controlled in a manner that is consistent with the type of alarm condition detected. For example, in FIG. 7 the DPM monitors for an input control signal 270 and controls the LED light fixtures based on the control signal(s) received by the DPM 104. It is contemplated that the system could be adapted to monitor for multiple alarm conditions 272. In one instance, the system determines whether a first alarm condition is present 274 and if present, the system is adapted to control the LED light fixtures in a predetermined manner according to the first alarm condition 276.

If no first alarm condition is present, the system could monitor for the presence of a second alarm condition 278. If it is determined that the second alarm condition present, the system is adapted to control the LED light fixtures in a predetermined manner according to the second alarm condition 280. If neither of the alarm conditions is present, the system is adapted to control the FCM and associated LED light fixtures based on the input signals received by the DPM 282. In any event, the LED light fixtures will be controlled according to a received signal 284. The control of the actual LED light fixtures will be defined by a programmed hierarchy such that, for example, if the first alarm condition is present, the first predetermined control signal will control the LED light fixtures regardless if any additional signals are present. Additionally, if the second alarm signal is present, but the first alarm signal is not present, then the system will control the LED light fixtures based on the second alarm signal. Finally, if neither of the alarm signals is present, the system will control the LED light fixtures based on the received control signal to the DPM.

In one example of what the first and second alarm signals could comprise include, the first alarm signal corresponding to a fire alarm and the second alarm signal corresponding to an interruption in power. In the first alarm condition, the lights could be adapted to be controlled in a predefined manner, such as, pulsing on/off in a predetermined pattern and/or at a predefined color. The second alarm condition could also into setting certain light fixtures to a predefined brightness level and set to a predetermined color during a loss of building power. It is contemplated that while only two alarm conditions are discussed herein, any number of multiple alarm conditions could be programmed to control the lights in a desired manner that is associated with that particular alarm. For instance, in facilities with very high security, if an alarm condition is present relating to a security breach, the intensity and color of the lights could be controlled in a predefined manner. Virtually any alarm condition can be conceived including alarms relating to natural disasters (areas prone to Tsunami warnings, or flash flood warnings, or tornado warnings, etc.) or environmental disasters (areas within the nuclear power plant evacuation zones), or any type of security threat(s) in government buildings, seaports, airports, train or bus stations, etc.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A lighting control system comprising:
   a digital power module (DPM) including:
      a processor;
      at least one control input operable to receive an input control signal; and
      an output operable to transmit an output control signal;
   a fixture control module (FCM) having identification data stored thereon and having an associated LED light fixture, and said FCM being connected to said DPM and adapted to receive the output control signal;
   said FCM adapted to control the associated LED light fixture according to the output control signal;
   said DPM being connected to a source of electrical power and being operable to provide D/C power to said FCM;
   a backup power supply having a battery, said backup power supply connected to said source of electrical power and said DPM and adapted to provide electrical power to said DPM and said FCM; and
   wherein when said DPM receives power from said source of electrical power, said DPM transmits said output control signal based on the received input control signal, said output control signal having identification data such that said FCM will control the associated LED light fixture according to the output control signal when the identification data in the output control signal matches the identification data stored on said FCM;
   wherein in the event of an interruption of electrical power from the source of electrical power, said backup power supply provides electrical power to said DPM and said DPM is adapted to transmit a predetermined emergency mode lighting control (EM) signal on the output, the EM signal including identification data such that said FCM will control the associated LED light fixture according to the EM signal when the identification data in the EM signal matches the identification data stored on said FCM.

2. The lighting control system of claim 1, wherein the identification data stored on said FCM comprises a data address and an EM address.

3. The lighting control system of claim 2, wherein the EM signal includes an Off instruction addressed to the data address and an On instruction addressed to the EM address.

4. The lighting control system of claim 3, wherein:
said FCM has a normal mode wherein upon receipt of the EM signal said FCM is configured to control the LED light fixture according to the Off instruction, and said FCM has an EM mode wherein upon receipt of the EM signal said FCM is configured to control the LED light fixture according to the On instruction; and
said FCM is being configurable in one of said normal and EM modes.

5. The lighting control system of claim 4, wherein said FCM has a user-operable mode selector operable to set said FCM in one of said normal and EM modes.

6. The lighting control system of claim 4, further comprising:
a plurality of FCMs connected to said DPM, said plurality of FCMs each having identification data stored thereon and having an associated LED light fixture, and being connected to said DPM and adapted to receive the output control signal;
said DPM and said backup power supply being operable to provide D/C power to said plurality of FCMs;
said plurality of FCMs each has said normal mode and said EM mode; and
said plurality of FCMs each being independently configurable in one of said normal and EM modes.

7. The lighting control system of claim 3, wherein the On instruction includes an intensity level at which the LED light fixture is to operate.

8. The lighting control system of claim 3, wherein the On instruction specifies a color at which the LED light fixture is to operate.

9. The lighting control system of claim 1, wherein:
in the event of the interruption of electrical power from the source of electrical power, the DPM is operable to cease sending the output control signal; and
when electrical power from the source of electrical power is restored, said DPM is operable to cease sending the EM signal and resume sending the output control signal.

10. The lighting control system of claim 1, wherein said DPM further comprises a test switch such that activation of said test switch simulates an interruption of electrical power from the source of electrical power.

11. The lighting control system of claim 10, wherein the simulated interruption lasts for a period of time.

12. The lighting control system of claim 10, further comprising a visual indication adapted to indicate a status.

13. The lighting control system of claim 12, wherein the status is selected from the group consisting of: DPM on main power, DPM on battery power, battery fully charged, battery charging and combinations thereof.

14. The lighting control system of claim 1, wherein said DPM further comprises a test module adapted to periodically test said processor, wherein if said processor is determined to be malfunctioning, said DPM is adapted to send a predetermined output to said FCM to operate the light fixture.

15. The lighting control system of claim 1, further comprising:
a storage accessible by said FCM, said storage having instructions saved thereon; and
wherein if said FCM fails to receive any signal, said FCM is adapted to operate in a predetermined mode of operation based on the instructions saved on said storage.

16. The lighting control system of claim 15, wherein the instructions indicate a predetermined intensity or a predetermined color or combinations thereof for the operation of the light fixture associated with said FCM.

17. A lighting control system comprising:
a digital power module (DPM) including:
a processor;
at least one control input operable to receive an input control signal; and
an output operable to transmit an output control signal having address data associated therewith;
said DPM being connected to a source of electrical power and being operable to provide D/C power to a fixture control module (FCM);
a backup power supply having a battery, said backup power supply connected to said source of electrical power and said DPM and adapted to provide electrical power to said DPM;
said FCM connected to said DPM and adapted to receive the output control signal, said FCM including:
a storage having a data address and an EM address stored thereon;
an LED light fixture;
said FCM receiving the output control signal and comparing the address data with the data address and the EM address, the FCM adapted to control the LED light fixture according to the output control signal when the address data matches either the data address or the EM address; and
wherein when said DPM receives power from said source of electrical power, said DPM transmits said output control signal based on the received input control signal that includes address data matching the data address such that said FCM will control the LED light fixture in accordance with the input control signal;
wherein in the event of an interruption of electrical power from the source of electrical power, said backup power supply provides electrical power to said DPM and said DPM transmits said output control signal based on a predetermined emergency mode lighting control (EM) signal that includes address data matching the EM address such that said FCM will control the LED light fixture according to the EM signal.

18. The lighting control system of claim 17, wherein the EM signal includes an Off instruction addressed to the data address and an On instruction addressed to the EM address.

19. The lighting control system of claim 18, wherein:
said FCM has a normal mode wherein upon receipt of the EM signal said FCM is configured to control the LED light fixture according to the Off instruction, and said FCM has an EM mode wherein upon receipt of the EM signal said FCM is configured to control the LED light fixture according to the On instruction; and
said FCM is configurable in one of said normal and EM modes.

20. The lighting control system of claim 19, wherein said FCM has a user-operable mode selector operable to set said FCM in one of said normal and EM modes.

21. A lighting control system comprising:
a digital power module (DPM) including:
a processor;
at least one control input operable to receive an input control signal; and an output operable to transmit an output control signal having address data associated therewith;

said DPM being connected to a source of electrical power and being operable to provide D/C power to a fixture control module (FCM);

a backup power supply having a battery, said backup power supply connected to said source of electrical power and said DPM and adapted to provide electrical power to said DPM;

said FCM connected to said DPM and adapted to receive the output control signal, said FCM including:
 a storage having a data address and an EM address stored thereon;
 an LED light fixture;

wherein when said DPM receives power from said source of electrical power, said DPM transmits said output control signal based on the received input control signal, and the output control signal includes address data matching the data address such that said FCM will control the LED light fixture in accordance with the input control signal;

wherein in the event of an interruption of electrical power from the source of electrical power for more than a predetermined amount of time, said backup power supply provides electrical power to said DPM and said DPM transmits said output control signal based on a predetermined emergency mode lighting control (EM) signal; and the EM signal including an Off instruction addressed to the data address and an On instruction addressed to the EM address;

said FCM having a normal mode wherein upon receipt of the EM signal said FCM is configured to control the LED light fixture according to the Off instruction, and said FCM having an EM mode wherein upon receipt of the EM signal said FCM is configured to control the LED light fixture according to the On instruction; and said FCM being configurable in one of said normal and EM modes.

22. The lighting control system of claim 21, wherein said FCM has a user-operable mode selector operable to set said FCM in one of said normal and EM modes.

23. The lighting control system of claim 21, further comprising:
 a plurality of FCMs connected to said DPM, said plurality of FCMs each having identification data stored thereon and having an associated LED light fixture, and being connected to said DPM and adapted to receive the output control signal;
 said DPM and said backup power supply being operable to provide D/C power to said plurality of FCMs;
 said plurality of FCMs each has said normal mode and said EM mode; and
 said plurality of FCMs each being independently configurable in one of said normal and EM modes.

24. The lighting control system of claim 21, wherein:
 in the event of the interruption of electrical power from the source of electrical power, the DPM is operable to cease sending the output control signal; and
 when electrical power from the source of electrical power is restored, said DPM is operable to cease sending the EM signal and resume sending the output control signal.

25. The lighting control system of claim 21, wherein said DPM further comprises a test switch such that activation of said test switch simulates an interruption of electrical power from the source of electrical power.

26. The lighting control system of claim 21, wherein the simulated interruption lasts for a period of time.

27. The lighting control system of claim 21, wherein said DPM further comprises a test module adapted to periodically test said processor, wherein if said processor is determined to be malfunctioning, said DPM is adapted to send a predetermined output to said FCM to operate the light fixture.

* * * * *